L. S. MASON.
Hop-Frame.
No. 44,104
Patented Sept. 6. 1864
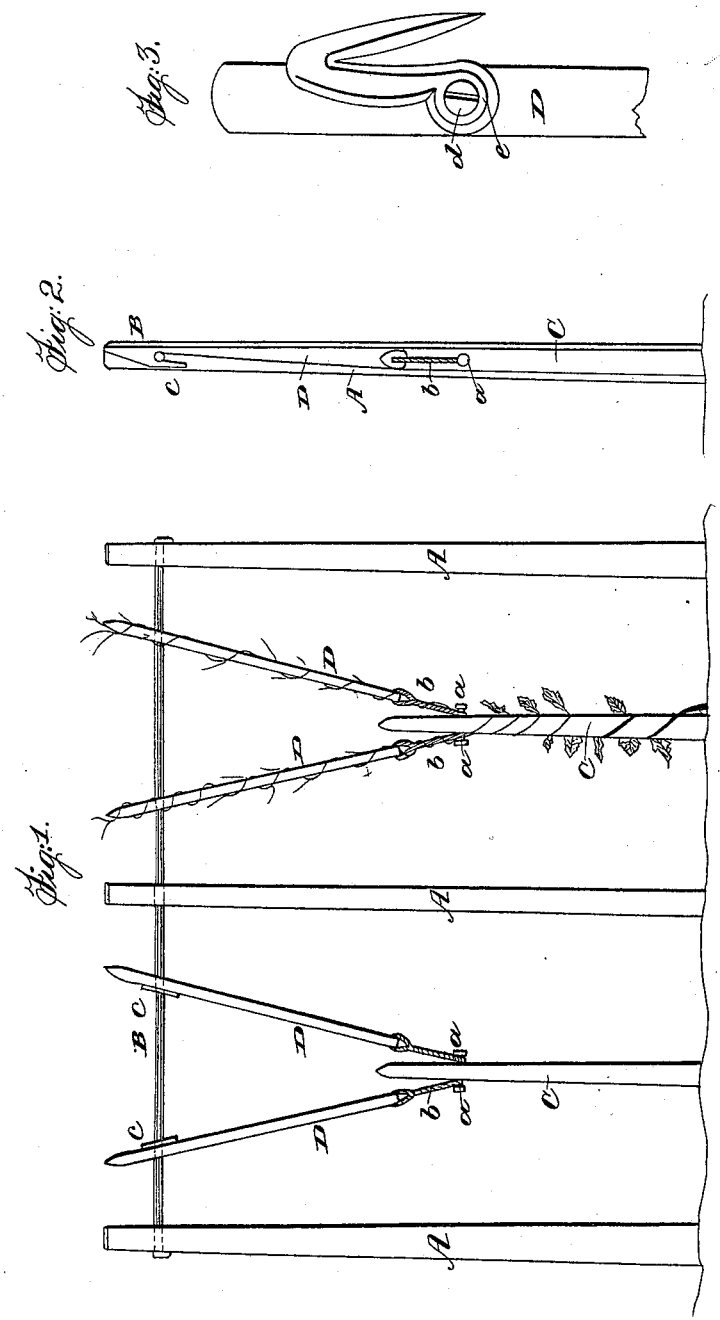
Witnesses
Henry Morris
C. L. Topliff
Inventor.
L. S. Mason
per Munn & Co
Attorneys

UNITED STATES PATENT OFFICE.

L. S. MASON, OF MIDDLEFIELD CENTRE, NEW YORK.

HOP-FRAME.

Specification forming part of Letters Patent No. 44,104, dated September 6, 1864.

*To all whom it may concern:*

Be it known that I, L. S. MASON, of Middlefield Centre, in the county of Otsego and State of New York, have invented a new and Improved Hop-Frame; and I do hereby declare that the following is a full, clear, and exact description thereof, which will enable those skilled in the art to make and use the same, reference being had to the accompanying drawings, making a part of this specification, in which—

Figure 1 represents a face view of my invention. Fig. 2 is a transverse vertical section of the same. Fig. 3 is a detached elevation of a hinged hook which I use to prevent the sticks from slipping on the horizontal or main wire in a larger scale than the previous figures.

Similar letters of reference indicate corresponding parts.

This invention consists in the employment or use of sticks suspended from the main wire by means of hooks and connected by short cords or wires to a stack driven in the ground in such a manner that the stack and sticks combined take the place of the training-wires, and by the use of the sticks a firm support is given to the hops, which is not liable to sway to and fro and preserves the hops from injury by high winds; and, furthermore, the sticks can be readily reached and unhooked from the ground, and the gathering of the hops is thereby considerably facilitated.

The invention consists, also, in the application to the stick of hinged hooks provided with eyes which are past the center lines drawn through the bights of said hooks in such a manner that a strain exerted on the sticks will cause the hooks to press the wire back against the sticks and said hooks are prevented from slipping on the main wire.

A A represent the uprights or supports which sustain the main wire B. Said supports are situated at a distance of twelve or more feet apart, and they are made of any convenient height and of sufficient strength for the occasion.

The hops are planted in hills at the usual distance apart, and each hill is provided with a stack, C, which is firmly driven into the ground. This stack may be made four or more feet high, or as high as may be convenient, and it is provided with two or more buttons, $a$, to retain the training-sticks D. These sticks are connected to the buttons $a$ by means of short cords or wires $b$, so that the same can be easily turned in any direction, and they are provided near their upper ends with hooks $c$ to hook over the main wire $b$. These hooks are either of wood or metal, and their bights ought to be made somewhat tapering, as shown in Fig. 2 of the drawings, so that the same, when hooked on the main wire, will take a firm hold of the same and the sticks are prevented from slipping. The best form of the hook, however, is that shown in Fig. 3. The hook $c^*$ represented there is made of malleable iron or any other suitable material, and it is hinged to the training-stick D by means of the pivot $d$. The eye $e$, through which the pivot passes, is past the center line drawn through the bight of the hook, so that when the hook is made to catch over the main wire any strain on the training-stick in a downward direction will have a tendency to throw the hook $c^*$ in the direction of the arrow marked near it in Fig. 3, and the main wire will be pressed up against the edge of the stick and firmly confined between it and the hook.

The training-sticks are preferable to training-wires, because the sticks are rigid and not liable to sway to and fro in a high wind, and particularly because in gathering the hops the sticks may be readily unhooked from the ground, and after the hops have been gathered they can just as easily be replaced, whereas in order to unhook the training-wires a step-ladder is required, or the main wire must be kept so low that it can be reached from the ground; and, finally, the original cost of the sticks is less than that of the wires and the sticks can be easier taken down and put away in winter-time, and when properly preserved they will last a long time.

The principal advantage of the stack is that it holds the vines up and prevents them from which they are liable to do during the time the hops are harvested when they are trained with poles or strings, and thereby the hill is killed.

I claim as new and desire to secure by Letters Patent—

1. The employment or use of training-sticks D, (in contradistinction to training-wires,) in combination with stacks C, cords or wires b, hooks c, and main wire B, constructed and operating in the manner and for the purpose substantially as herein shown and described.

2. The hook c*, having its eye e past the center of its bight, and applied, in combination with the training-stick D and main wire B, in the manner and for the purpose substantially as set forth.

LINUS S. MASON.

Witnesses:
WM. HANNAH,
HIRAM COON.